Sept. 6, 1960 C. GOODMAN 2,951,943
BOREHOLE INVESTIGATING APPARATUS
Filed May 7, 1956 2 Sheets-Sheet 1

FIG. I

INVENTOR.
CLARK GOODMAN
BY Robert Hockfield
HIS ATTORNEY

Sept. 6, 1960   C. GOODMAN   2,951,943
BOREHOLE INVESTIGATING APPARATUS
Filed May 7, 1956   2 Sheets-Sheet 2

INVENTOR.
CLARK GOODMAN.
BY Robert Hockfield
HIS ATTORNEY.

United States Patent Office 2,951,943
Patented Sept. 6, 1960

2,951,943

BOREHOLE INVESTIGATING APPARATUS

Clark Goodman, Boston, Mass., assignor, by mesne assignments, to Schlumberger Well Surveying Corporation, Houston, Tex., a corporation of Texas Filed May 7, 1956, Ser. No. 583,025

5 Claims. (Cl. 250—83.3)

This invention relates to methods and apparatus for investigating materials and, more particularly pertains to new and improved methods and apparatus of the type disclosed in copending application Serial No. 545,841 of C. Goodman and H. B. Frey, filed on November 9, 1955, involving a nuclear chain reaction for investigating materials.

Briefly stated, according to the disclosure in that application, a nuclear chain reaction is established which is influenced by a constituent of the material under investigation and indications dependent upon a radiation product of the reaction are obtained. Such indications may, for example, be representative of a control effect exerted on the reaction, a resulting nuclear phenomenon in the material, or a physical parameter in a space occupied by the reaction.

A specific use of methods and apparatus of the foregoing type is in the investigation of earth formations and it is an object of the present invention to provide new and improved methods and apparatus of that type in which the indications are more representative of a characteristic of the earth formations under study.

Another object of the present invention is to provide new and improved methods and apparatus for determining the reservoir fluid in earth formations traversed by a borehole with greater accuracy than heretofore possible.

Yet another object of the present invention is to provide new and improved methods and apparatus for investigating earth formations particularly suited to distinguish between hydrogen bound in water and hydrogen bound in a hydrocarbon.

A further object of the present invention is to provide a new and improved neutron source adapted to irradiate a material during selected intervals of time.

In accordance with the present invention, earth formation material is investigated by establishing a nuclear chain reaction influenced by a constituent of the material. Radiation of one form from the nuclear chain reaction is converted to radiation of another form having an influence on the reaction and indications may be derived in response to resulting nuclear phenomena in the material under investigation. Alternatively, a characteristic of a physical parameter in a space occupied by the nuclear chain reaction may be indicated.

According to a particular embodiment of the present invention, apparatus for investigating earth formations traversed by a borehole comprises a support adapted to be passed through the borehole. A controllable nuclear chain reactor is carried by the support and means are provided for urging at least a portion of the reactor toward the sidewall of the borehole.

In accordance with another aspect of the invention, a subcritical nuclear-chain-reacting mass is disposed adjacent material to be investigated. Radiant energy is supplied to the mass to initiate and maintain a nuclear chain reaction, and indications, dependent at least in part upon a characteristic of the nuclear chain reaction, are obtained.

The novel features of the present invention are set forth with particularity in the appended claims. The present invention, both as to its organization and manner of operation, together with further objects and advantages thereof, may best be understood by reference to the following description taken in connection with the accompanying drawings in which:

Fig. 1 is a view in longitudinal section schematically illustrating neutron logging apparatus constructed in accordance with the present invention;

Figures 2A, 2B:
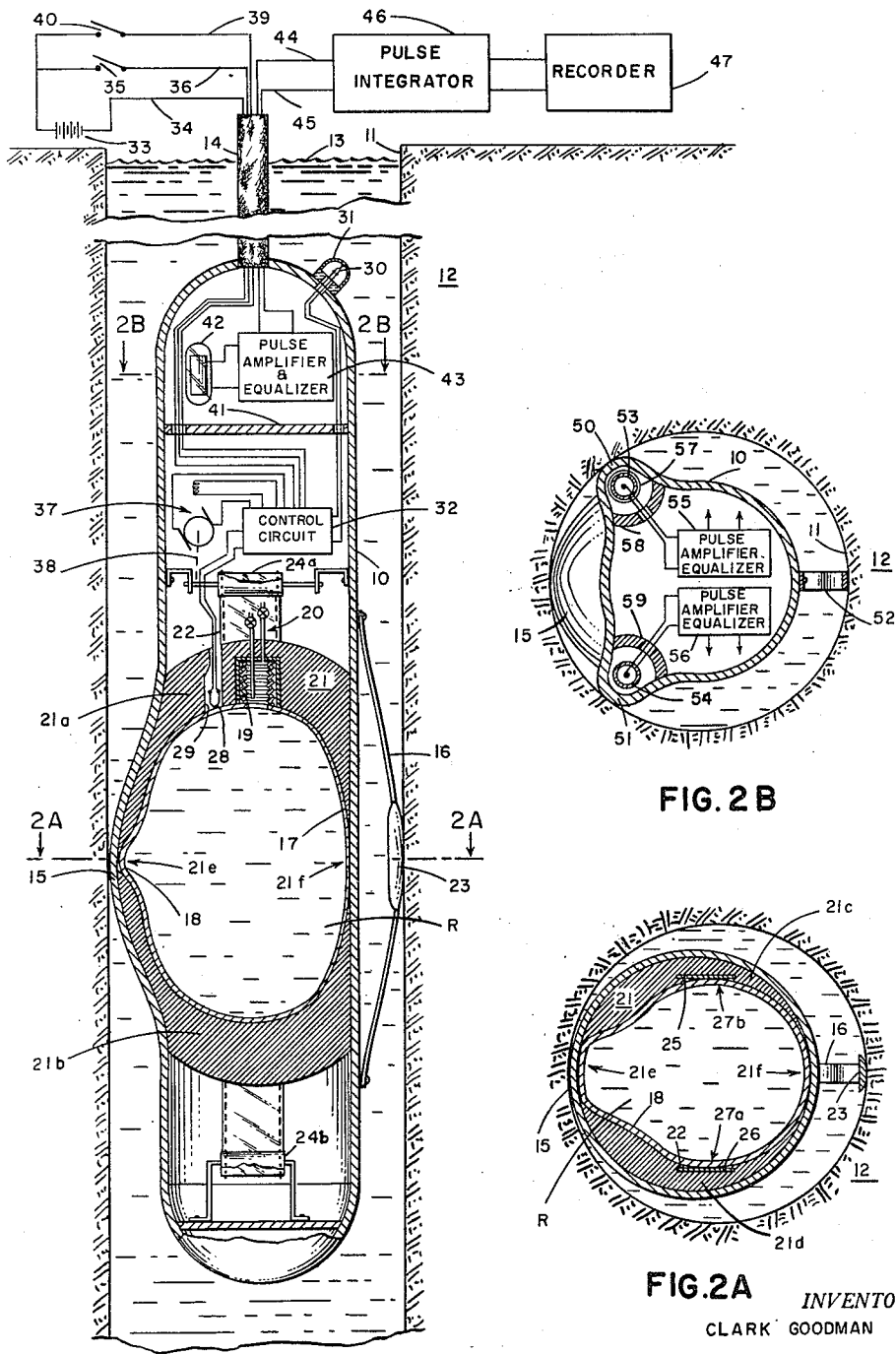
Fig. 2A is a cross sectional view in the plane of line 2A—2A of Fig. 1.
Fig. 2B is a cross sectional view in the plane of line 2B—2B of Fig. 1, but representing a modification which may be made to the apparatus there shown.

In Fig. 1 of the drawings, neutron well logging apparatus constructed in accordance with the present invention is shown to comprise a pressure-resistant housing or support 10 disposed in a borehole 11 traversing a plurality of earth formations 12 and containing a hydrogenous drilling fluid 13 such as an oil base or water base mud. Housing or support 10 is suspended in borehole 11 by an electric cable 14 which may be employed together with a winch (not shown) to lower and raise housing or support 10 in a customary manner.

Housing or support 10 is provided with a lateral protrusion 15 maintained in engagement with the wall of borehole 11 in any suitable manner. For example, a bowed, radially extending spring 16 may be used. Although but a single such spring is illustrated, as many as required to maintain the required engagement should be employed.

Supported within housing or support 10 is a container 17 having a protrusion 18 disposed in interfitting relation within protrusion 15. Housing or support 10 may be constructed of steel and may include a beryllium section in the vicinity of protrusion 15 thin enough to be neutron transparent. Container 17 may be constructed of stainless steel and its upper end is connected to a stainless steel Sylphon bellows 19 through which a filling and venttube arrangement 20 extends. Appropriate valves are provided so that tube arrangement 20 may be used to introduce a nuclear chain reacting solution R to container 17.

As discussed in the aforementioned copending application, solution R may be composed of uranyl sulfate and water prepared in a known manner from uranium rich in the isotope of atomic weight 235. Preferably, the concentration of $U_{235}$ relative to $U_{238}$ is greater than 15%. The water should be of high purity, such as may be obtained by conventional distillation techniques. The amount of uranyl sulfate employed is selected so that a ratio of hydrogen to uranium in the neighborhood of 200 is obtained. Thus, for a given volume and surface area of container 17, the solution is normally inactive, but under conditions within borehole 10, a controllable nuclear chain reaction can be established.

To assist in maintaining the nuclear chain reaction, a neutron reflector 21 constructed, for example, of beryllium is supported within housing or support 10. The reflector includes upper and lower sections 21a and 21b which may be provided with hemispheric concavities so they can be disposed in close interfitting relationship with the upper and lower ends of container 17. As best seen in Fig. 2A, reflector 21 also has laterally spaced sections 21c and 21d extending between the upper and lower sections thereby to enclose container 18 in essentially its entirety with the exception of fore and rear "windows" 21e and 21f.

A converter plate 23 is supported centrally on spring 16 opposite window 21f. Plate 23 may, for example, be composed of an alloy or layer of fissionable material, such as enriched uranium-235. Of course, other fissionable materials may be used such as uranium-233, plutonium-239 or plutonium-241.

In order to regulate the reaction, there is provided a control strip 22 in the form of an endless belt or tape. The belt has perforations which receive the teeth of toothed wheels 23 and 24 appropriately supported above and below the reflector sections 21a and 21b so that the belt can pass into the reflector 21 through upper and lower pairs of laterally-spaced slots (not shown). As illustrated in Fig. 2A, extensions 25 and 26 of these slots carry portions of belt 22 into close association with container 18 at sections 27a and 27b laterally spaced apart in a direction transverse to a line through windows 21e and 21f.

Control belt 22 may be constructed of any neutron-absorbing material to a limited extent. For example, as discussed in the aforementioned copending application, the belt may be a conventional sensitized nitro-cellulose film, exposed and fixed in a well known manner to produce a silver deposit of continuously variable density along the film. The silver deposit is arranged so that the belt has a neutron absorbing section slightly longer than the longitudinal dimension of container 17 followed by a non-absorbent section of similar length; another absorbent section is disposed opposite the first-mentioned absorbent section, but is oriented in reverse variable-density relationship and is connected thereto by another non-absorbent section. The structural arrangement is such that the belt is movable along a path adjacent to the portions 27a and 27b of the reactor container 17 so that a continuous control may be effected without interference with the "window" portions 21e and 21f of the reactor adjacent to the formations and plate 23.

A first temperature-sensitive device or thermocouple 28 is disposed within an opening 29 in reflector portion 21a and is in engagement with the wall of container 17. Another thermo-couple 30 is disposed within a small housing 31 supported at the upper end of housing or support 10. Housing 31 is thermally insulated from housing or support 10 and is exposed to borehole fluid 13. The thermocouples 28 and 30 are connected to a conventional control circuit 32 which produces a control effect in response to the temperature differential between the thermocouples.

A power source, such as a battery 33, at the surface of the earth has one of its terminals connected to control circuit 32 by an electrically insulated conductor 34 of cable 14. Circuit 32 is connected to the remaining terminal of battery 33 via an operating switch 35 and another insulated conductor 36 of cable 14. With switch 35 closed, electrical energy is supplied directly to a driving motor 37 mechanically connected by a coupling schematically illustrated by a dash line 38, to toothed wheel 23.

Another energization circuit is completed to control circuit 32 by a cable conductor 39 and an operating switch 40. When switch 40 is closed, the control effect produced by circuit 32 governs the operation of motor 37 so that belt 22 is displaced in a manner tending to maintain a selected temperature differential between thermocouples 28 and 30.

A gamma ray shield 41 separates an upper compartment of housing 10 from the reactor below, and a gamma ray detector, such as a Geiger counter 42, is supported above the shield. The Geiger counter is coupled to a pulse amplifying and equalizing circuit 43, of conventional construction, connected by cable conductors 44 and 45 to a conventional pulse integrator 46 located at the surface of the earth. Integrator 46 derives a potential having a magnitude dependent upon the time rate of occurrence of the applied pulses and is connected to a conventional recorder 47 in which the recording medium is displaced in proportion to movement of housing or support 10 through borehole 11.

To prepare the logging apparatus just described for operation, prior to insertion in borehole 11 switch 35 is closed for an interval sufficient to energize motor 37 to carry belt 22 to a position at which maximum neutron absorption occurs. The uranyl sulfate solution R may then be safely introduced and thereafter the housing may be lowered in borehole 11.

After a depth is reached in which adequate shielding is afforded by the formations and the drilling mud to protect operating personnel, switch 40 is closed thereby to place motor 37 under the influence of control circuit 32.

A sufficient volume of uranyl sulfate solution R is contained in reactor vessel 17 to produce appreciable neutron multiplication, but not quite sufficient to maintain a nuclear chain reaction without the presence of formations 12. Thus, regardless of the position of control belt 22, outside the borehole 11 a nuclear chain reaction does not occur. In the borehole, however, a reaction does occur because some of the neutrons which leak out radially through "window" 21e are reflected back by the formations. Furthermore, some of the thermal neutrons from the reactor solution R that pass through "window" 21f and impinge on converter plate 23 are converted into fast, fission neutrons some of which enter container 17 and are effective in maintaining the chain reaction.

When the rate of reaction within the container 17 is low, the temperature therein is relatively low and therefore the temperature of thermocouple 28 is very little different from the temperature of thermocouple 30. Accordingly, control circuit 32 causes motor 37 to drive control belt 22 toward a position at which minimum neutron absorption occurs. As fewer neutrons are absorbed, more of the neutrons emanating from material R may be reflected back. In particular, hydrogen in the formations causes reflections and in some position of control belt 22, criticality is obtained whereby a continuous nuclear reaction is maintained.

Of course, heat produced during the reaction is lost to drilling mud 13 so that the power within the reactor is a function of the rate of reaction as well as the temperature difference between container 17 and the drilling mud 13. Control circuit 32 is adjusted so that at a desired reactor power, a prescribed temperature differential exists between the temperature measuring points at which thermocouples 28 and 30 are located. Thus, if the reaction rate increases so that the prescribed temperature difference is exceeded, control circuit 32 directs motor 37 to position control belt 22 so that the rate of reaction is reduced. Similarly, if the temperature difference becomes too small, the belt is driven in the opposite direction. It is thus evident that automatic control is provided by means of which a constant power is maintained within the reactor.

Furthermore, as the reactor passes through the borehole, it encounters drilling mud 13 of varying temperatures. This, of course, is a well known phenomenon, i.e., the temperature of the drilling mud increases with depth. Obviously, by providing a temperaturing sensing element 30 above housing or support 10 the arrangement is designed for logging in an upward direction since the drilling mud through which the housing or support 10 has already passed is changed from its ambient temperature as a result of heat loss from the reactor.

As housing or support 10 passes upwardly through the borehole, a relatively intense flux of slow neutrons in a range in the vicinity of and below one electron volt passes through "window" 21e and irradiates the earth formations. However, a zone of formation material adjacent converter plate 23 is shielded from low energy neutrons by this plate and high energy neutrons from the converter plate irradiate this portion of the earth formations. Neutrons of both energy ranges are capable of producing gamma radiation, the lower energy neutrons through capture reactions while the high energy neutrons by inelastic collisions or by low energy capture after moderation. Some of the resulting gamma radiation impinges on Geiger detector 42 and the pulses from this detector are amplified and equalized. Thus, pulses of uniform height and duration are supplied to pulse integrator 46, but at a time rate of occurrence depending upon certain characteristics of earth formations 12. The resulting potential is recorded in recorder 47 and a continuous log of hydrogen content versus depth is obtained.

Inasmuch as neutrons emanate from protrusion 15 and from converter plate 23, both of which are in close association with the sidewall of the borehole, the effects of drilling mud 13 are minimized. Thus, the log in recorder 47 provides more accurate indications of hydrogen content of formations 12.

If desired, "window" 21f may be enlarged and the converter material can be incorporated in a cylindrical housing surrounding the portion of housing or support 10 adjacent container 17, exclusive of the section in which protrusion 15 is located. Thus, a cylindrical source of the fast neutrons may be effected. Alternatively, the converter material may be incorporated as an integral part of housing or support 10. Such an extended source of fast neutrons is of particular value in studying the properties of thick uniform beds in earth formations 12.

Instead of application to well logging, a housing similar to the one shown in Fig. 1 may be appropriately supported in a stream of either an inorganic or an organic fluid to be analyzed. Thus, the fluid may flow continuously and coaxially about the reactor and useful information concerning the composition of the fluids may be obtained.

Another type of log may be derived by recording the position of belt 22 as a function of depth. This is in the nature of an "albedo" log which, as defined in the aforementioned copending application, is representative of the neutron reflectivity of material in earth formations 12.

Although the reactor has been illustrated as being under the control of the temperature differential between the thermocouples 28 and 30, other modes of control are within the scope of the present invention. Thus, control belt 22 may be positioned in response to fluid pressure within container 17 or to the neutron flux at a monitor point as disclosed in the aforementioned copending application of Goodman and Frey.

It is also within the contemplation of the present invention to use control belt 22 in a different manner. Thus, instead of the tape being movable along paths adjacent to the sides of container 17, the tape may be arranged, for example, to pass adjacent the window portions 21e and 21f, essentially as described in the aforementioned copending application.

The apparatus of Fig. 1 may be modified so that above shield 41, housing or support 10 includes a pair of laterally spaced protrusions 50 and 51, illustrated in Fig. 2B, which are arranged to engage the sidewall of borehole 11. If necessary, an additional bowed spring 52 may be employed to maintain the required contact with the sidewall.

Within each of the protrusions 50 and 51 a respective radiation responsive device is disposed, such as the Geiger counters 53 and 54. The counters are connected to pulse amplifier and equalizers 55 and 56, in turn, coupled to respective pulse integrators (not shown) whose output voltages are supplied to recorder 47 (Fig. 1).

Alternatively, the detectors 53 and 54 may be constructed to be responsive to neutrons. For example, they may be filled with boron trifluoride and operated so that a gas discharge occurs in response to incident neutrons. One of the detectors, such as the one designated 53 is provided with a cadmium enclosure 57 so that it responds to neutrons in a selected portion of the energy spectrum of neutrons returning from formations 12, as will be apparent from the discussion to follow.

For this embodiment, shield 41 (Fig. 1) should be constructed in an appropriate manner so that detectors 53 and 54 are shielded from neutrons from reactor vessel 17 and additional neutron shields 58 and 59 are disposed behind respective ones of the detectors 53 and 54. These shields, for example, may be constructed of boron or a boron-loaded plastic material.

In operation, the nuclear chain reaction within vessel 17 provides a copious supply of leakage neutrons. This flux is predominately composed of neutrons in an energy range below about one electron volt. Such neutrons pass through "window" 21e (Fig. 1) into earth formations 12 in which they diffuse. Ultimately, each such neutrol is lost by capture, by decay into a proton and an electron, or by diffusion out of range of a detection system. When equilibrium is reached, the rate of supply of thermal neutrons just equals the rate of loss by the above three processes, and the neutron density throughout the zone of investigation in the formations remains constant with time, although not in space. It should be noted at this point that most of the diffusion occurs in hydrogeneous substances in the formations such as water or hydrocarbons.

Figure 3:
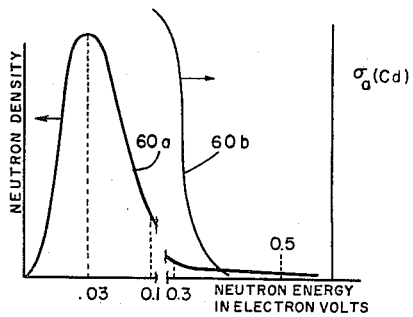
Fig. 3 is a plot of neutron density and neutron-absorption cross section for cadmium versus neutron energy, useful in explaining the operation of the embodiment shown in Fig. 2B.

In equilibrium state, characterized by equal rates of thermal neutron loss and gain, the energy distribution of neutrons is approximately Maxwellian as represented by curve 60a in Fig. 3 which is a plot of neutron density versus neutron energy in electron volts. Curve 60a, of course, represents the average distribution for a given reactor temperature and a given temperature of the diffusing medium. It will be observed that at the higher energy end of the curve, the distribution falls off relatively sharply as compared to a theoretical Maxwellian distribution. This occurs because higher energy neutrons developed in the reactor have a greater probability of leaking out than do the ones at lower energy.

It has been shown that when the neutron energy is very large compared to the binding energy of a hydrogen atom in a molecule, the scattering of neutrons by protons may be considered to be the same as that for free protons. Furthermore, this binding energy is associated with the vibration of the hydrogen in the molecule for which the carbon-hydrogen bond corresponds to approximately 0.4 in electron volts. For slow neutrons, of energies less than about one electron volt, the molecular binding of protons must be considered. In the limiting case of very small neutron energies, the scattering cross section for chemically bound hydrogen is four times that for free protons. Hence, for practical purposes the scattering cross section of hydrogen may lie between 20.3 and 81.2 barns for neutrons below one electron volt.

Chemical binding produces two effects. The first is that it is not possible to impart energy to the proton alone. Instead, collisions with bound protons effect the vibrational energies of the hydrogen moving relative to the rest of the molecule and the motion of some groups within the ensemble with respect to the rest of the molecule. This, is of particular interest in well logging in view of the presence of petroleum hydrocarbons as represented by $(CH_2)_n$.

In the first case, the transfer of energy is similar to that for free protons inasmuch as there is considerable probability that the neutron loses practically all its energy in one collision. However, such a transfer is larger than the vibrational energy involved. A neutron of smaller energy can transfer energy only to vibrations of the second type mentioned above, and the effect of the collision will be similar to that of collisions with the free $CH_2$ group of mass 14. Of course, this assumes the neutron energy is larger than the quantum energies of all the oscillations of the $CH_2$ groups with respect to each other. For still lower energies of the neutron, the effect of the mass is still larger. It may be shown, from the standpoint of average energy loss per collision, the neutron loses energy more slowly once it reaches the region of chemical binding.

However, the second effect of chemical binding is to increase the probability of scattering collisions which results in an increase in the rate of energy loss by neutrons.

A third effect is the change in the angular distribution of neutrons after scattering. This distribution is uniform for low energy neutrons scattered by $(CH_2)_n$ whereas no neutrons are deflected more than 90° by free protons.

Curve 60a of Fig. 3 may be taken to represent the neutron distribution in the vicinity of detectors 53 and 54. Detector 53 is energy selective by virtue of the presence of cadmium enclosure 57. This may best be appreciated by referring to curve 60b of Fig. 3 which represents the absorption cross section, $\sigma_a$, for cadmium versus neutron energy. From curve 60b it is evident that the detector 53 responds substantially only to neutrons having an energy greater than approximately 0.3 electron volt. For this reason the time rate of occurrence of pulses applied to and translated by circuit 55 will be representative largely of the hydrogen content of the formations. Detector 54 responds to neutrons of all energies. However, because of the increase in absorption cross section of boron (in the gas filling the detector) with decreasing neutron energy, the primary effect is produced by thermal neutrons. Since the neutrons of lower energies are more strongly affected by the nature of the chemical binding in which hydrogen is found, the rate of occurrence of the pulses supplied to translating circuit 56 will depend not only on hydrogen content, but also upon the molecules in which the hydrogen is bound. In other words, the difference between the spectral distributions of neutrons, reaching the detectors 53 and 54, will be dependent upon the molecular composition of the earth formations 12. Thus, by deriving voltages representing the time rate of occurrence of the pulses in the output signals of circuits 55 and 56 and computing either a ratio of or the difference between the derived voltages, logs may be obtained which are representative of the molecular composition of the fluids in the adjacent formations. Hence, this method provides a means of distinguishing between hydrogen bound as $H_2O$ and bound as $H_2C$, a hydrocarbon.

While a particular energy-selecting material has been described in connection with enclosure 57 for detector 53, obviously, others may be employed to emphasize certain portions of the neutron energy spectrum. For example, the shield may be composed of indium, a layer of boron or a material containing iodine. Alternatively, instead of boron trifluoride counters, a boron-loaded plastic scintillation detector may be employed as may lithium iodide scintillators or uranium 235 fission detectors.

Since the detector arrangement in Fig. 2 brings the detectors in close association with the sidewall of borehole 11, the indications are more nearly representative of the true content of the formations 12. Specifically, the deleterious effect of the mud 13 in the borehole is reduced to a considerable extent.

If desired, another pair of detectors may be positioned in the space of housing or support 10 opposite detectors 53 and 54 and arranged to respond to radiant energy resulting from irradiation of the formations by high energy neutrons from converter plate 23 (Fig. 1). For example, the detectors may respond to gamma radiation or neutrons in a selected energy range higher than the energies of leakage neutrons from the reactor.

Figure 4:
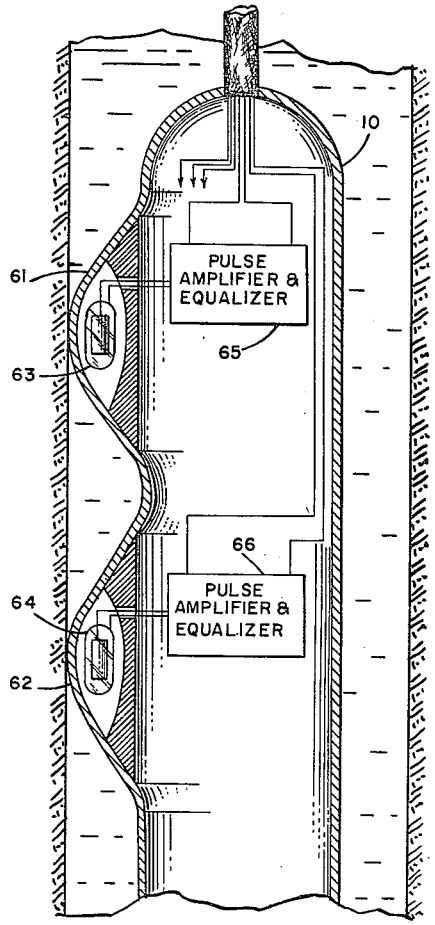
Fig. 4 represents another modification which may be made to a portion of the apparatus in the upper end of the housing illustrated in Fig. 1.

In the arrangement of Fig. 4, housing 10 is provided with sidewall engaging protrusions 61 and 62 that are longitudinally spaced from reactor protrusion 15 (Fig. 1) and from one another. Each protrusion houses a respective one of detectors 63 and 64 whose outputs are applied to amplifier and equalizer circuits 65 and 66, respectively. The detectors 63 and 64 may be arranged in the same way as are the detectors 53 and 54 of Fig. 2; namely, one responds to neutrons of all energies while the other is restricted to a relatively small range of energies. Thus, in addition to being responsive to neutron energy distribution in time, apparatus featuring the embodiment of Fig. 4 also responds to the spacial distribution of neutrons in the direction of the longitudinal axis of borehole 11.

If desired, the detectors 63 and 64 may be appropriately constructed so as to respond to gamma radiation either without energy selection or to individual ranges in the gamma radiation spectrum. Of course, one of the detectors may respond to slow neutrons while the other is sensitive to gamma radiation. From observations derived with this embodiment, new and useful information about formations 12 may be obtained.

By combining the arrangements of Figs. 2B and 4 in a suitable manner, a more accurate determination of molecular composition may be achieved by appropriately combining the several output signals.

In the embodiment of the invention illustrated in Fig. 5, housing or support 10 encloses a container 70 filled with a nuclear chain reacting material R' similar to the material R described in connection with Fig. 1. However, despite the presence of neutron reflector 71 and any reflecting material in earth formations 12, mass R' is in a sub-critical condition. More specifically, mass R' may be arranged in a known manner to exhibit a reproduction constant, K, approximately equal to 0.90, or greater, when outside the borehole and a $K=0.999$ when in the borehole and surrounded by the best possible neutron-reflecting material, e.g., pure water or a hydrated limestone. In other words, under no circumstances can a nuclear chain reaction occur in the absence of separate excitation.

A coaxial tube 72 which may be constructed of steel extends through the upper end of container 70 and into core material R'. The tube is appropriately sealed to container 70 so the reactor material may not enter and it defines a well 73. Supported within well 73 is a neutron source 74. Source 74 may be in the form of a neutron generator comprised of a sealed envelope filled with deuterium gas at a relatively low pressure, means for ionizing the gas to produce ions thereof and means for accelerating such ions toward an appropriate target. The target includes deuterium or tritium so that after acceleration through an appropriate potential, say on the order of 50 kilovolts, deuterium ions react with target material to produce neutrons. Neutron source 74, may for example, be constructed in the manner described in the copending application of J. T. Dewan, Serial No. 281,378, filed on April 9, 1952.

An appropriate power supply 75 within housing or support 10 provides the required operating potentials for the ion source and accelerating gap sections of neutron source 74. A conventional control circuit 76 may be inserted in the high voltage lead and a pair of conductors 77 extend to the surface of the earth so that the neutron source 74 may be selectively operated from a remote location.

In operation, after housing or support 10 is positioned at a selected depth within borehole 11, an appropriate switch (not shown) in leads 77 is closed and control circuit 76 is actuated thereby to initiate operation of neutron source 74. Neutrons of relatively high energy from the source are slowed by the moderator (water) in core material R', after which, by producing fissions in the core material, multiplication or augmentation of the number of neutrons occurs.

To first order, the multiplication is proportional to $$\frac{1}{|\Delta K|}$$

where $|\Delta K|$ is the absolute magnitude of the excess reactivity, i.e., $\Delta K=K-1$ for a continuous reaction in which K is the effective reproduction constant of the reactor. In the embodiment of Fig. 5, K is in a range from 0.90 to 0.999, therefore $\Delta K$ may have values from $-0.1$ to $-0.001$ and $$\frac{1}{|\Delta K|}$$

from 10 to 1,000. That is, for every neutron produced in the neutron source 74, there are from 10 to 1000 fission neutrons produced in the reactor depending on the nature of the formations. Consequently, when neutron source 74 is energized, continuous neutron multiplication occurs and the apparatus may be employed to derive information about the formations.

For example, near a formation of high neutron absorption, the multiplication may be in the vicinity of 10. In the presence of oil-bearing formations, however, the multiplication may increase to 100 or more, even though the reactor itself, in the absence of excitation from generator 74, is below critical.

Since the reactor proper operates in a sub-critical condition, no control mechanism is required, and it will only produce neutrons when generator 74 is operating. Obviously, this is an important safety feature.

If desired, control circuit 76 may be arranged to apply high voltage pulses to neutron source 74. Accordingly, the reactor may be operated so as to supply neutrons during repetitive, relatively short intervals of time. By obtaining indications of neutrons diffused through the formations at different times, additional information concerning the composition of the formations may be obtained.

Figure 6:
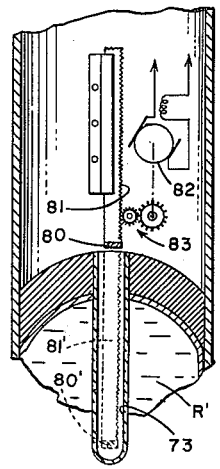
Fig. 6 illustrates another way of carrying out the embodiment of the invention illustrated in Fig. 5.

Another way of initiating and maintaining neutron multiplication in sub-critical material R' is shown in Fig. 6. Well 73 is empty in the non-active condition of the device and a neutron source 80, composed for example, of a mixture of radium and beryllium is supported above the well at the lower end of a rack 81. The rack is movable along a longitudinal path and thus by energizing a motor 82 coupled to a driving pinion 83, the rack and the source may be selectively moved into the well to positions designated 80' and 81'.

The neutron source provides enough neutrons so that after multiplication an intense source of neutrons is maintained in material R'. When it is desired to stop the reaction, motor 82 is energized to drive rack 81 in the opposite direction to bring source 80 to the initial position shown in Fig. 6.

Of course, other source materials may be used such as a polonium-beryllium mixture as may other driving mechanisms for the source be employed. If desired, a hollow shield may be provided for the source 80 in its position illustrated in Fig. 6.

Pulses of neutrons may be produced in the arrangement of Fig. 6 by causing rack 81 to oscillate or move periodically into well 73. This may be done, for example, by incorporating a suitable timing circuit of conventional construction in the energizing circuit for motor 82.

Figure 5:
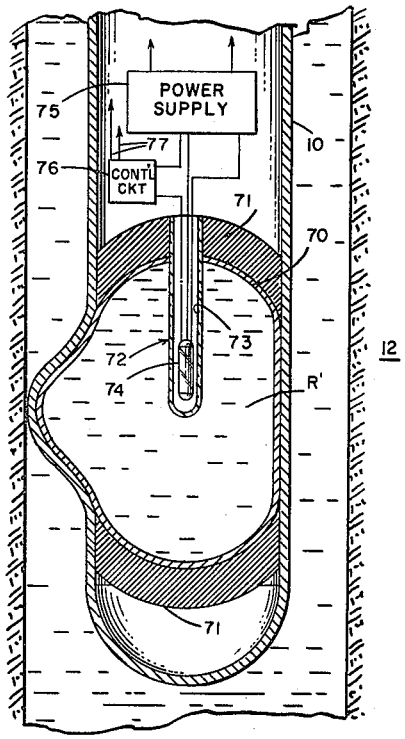
Fig. 5 represents yet another modification which may be made in a portion of the apparatus in the lower end of the housing shown in Fig. 1.

It will be noted that each of the reactors shown in Figs. 5 and 6 constitute an intense source of neutrinos. By periodically pulsing either of these, the earth formations may be irradiated with neutrinos during short intervals of time. Since neutrinos may traverse large thickness of the earth, these pulses of neutrinos may reach the surface of the earth and will be superimposed on the steady flux of neutrinos that reach the earth from the sun. By the use of an appropriate neutrino-responsive scintillating material, an adequate number of photomultipliers for converting light flashes from the scintillator to electrical signals, and suitable pulse selection circuits, the neutrinos passing through the earth may be selected and recorded. Thus, a continuous log as a function of depth of the reactor provides indications of the hydrogen content of the earth formations.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. Apparatus for investigating earth formations traversed by a borehole comprising; a support adapted to be passed through a borehole; a controllable nuclear chain reactor carried by said support and including a mass of fissionable material dispersed in a moderator and surrounded by a neutron reflector having at least one window therein adapted to be exposed to a portion of the adjacent earth formation, said reactor being inactive when out of the borehole but being capable of maintaining a nuclear chain reaction when exposed to the earth formation in a well; means for urging said support laterally in the borehole to urge said reflector window against the side of the borehole; neutron absorber means adjustable relatively to said reactor to control the power level thereof; means responsive to temperature differential between said reactor and a reference datum for adjusting the position of said absorber means relatively to said reactor to maintain said reactor at a predetermined power level of operation; and detector means carried by said support and responsive to an effect resulting from irradiation of the adjacent formations by neutrons from said reactor.

2. Borehole investigating apparatus as in claim 1 in which the reflector has a second window formed therein through which neutrons are adapted to pass to impinge upon a fissionable material on converter means carried by said support.

3. Borehole investigating apparatus as in claim 1 in which the reference datum is the temperature in the borehole at the level of support and in which the adjusting means for the neutron absorber means functions to maintain a predetermined differential between said borehole temperature and the reactor temperature.

4. Borehole investigating apparatus as in claim 1 in which the detector means comprises first and second neutron responsive detectors maintained in close association with the side wall of the borehole for deriving electric signals representing neutrons in first and second energy ranges, respectively.

5. Borehole investigating apparatus as in claim 4 in which said first energy range includes energies up to and including one electron volt and said second energy range includes energies up to and including a fraction of one electron volt.

References Cited in the file of this patent

UNITED STATES PATENTS

| | | |
|---|---|---|
| 2,719,823 | Zinn | Oct. 4, 1955 |
| 2,751,505 | Anderson | June 19, 1956 |
| 2,778,950 | Frey et al. | Jan. 22, 1957 |
| 2,778,951 | Tittman | Jan. 22, 1957 |